United States Patent [19]

Smith

[11] 4,068,088
[45] Jan. 10, 1978

[54] UNDERGROUND MINE EQUIPMENT

[75] Inventor: Job Frederick Smith, Derby, England

[73] Assignee: Coal Industry (Patents) Limited, London, England

[21] Appl. No.: 660,815

[22] Filed: Feb. 24, 1976

[30] Foreign Application Priority Data

Mar. 20, 1975 United Kingdom ............... 11619/75

[51] Int. Cl.² .............................................. H01B 7/24
[52] U.S. Cl. ...................................... 174/136; 138/110
[58] Field of Search ....................... 254/190 R, 135 R; 174/136, 135; 308/3.6; 138/110, 111, 108, 120; 191/126; 114/243; 248/68 CB

[56] References Cited

U.S. PATENT DOCUMENTS

| 1,822,624 | 9/1931 | Hoeftmann | 174/136 |
| 2,172,130 | 9/1939 | Powell | 138/110 |
| 2,632,836 | 3/1953 | Ackley | 174/136 |
| 2,829,190 | 4/1958 | Comlossy, Jr. | 174/136 |
| 2,975,807 | 3/1961 | Waninger | 191/126 |
| 3,060,972 | 10/1962 | Sheldon | 138/120 |
| 3,071,161 | 1/1963 | Ulrich | 138/120 |
| 3,382,668 | 5/1968 | Berkes et al. | 138/108 |
| 3,428,742 | 2/1969 | Smith | 174/136 |
| 3,467,047 | 9/1969 | Chatten et al. | 114/243 |

FOREIGN PATENT DOCUMENTS 1,250,823 5/1969 United Kingdom ................. 174/136

Primary Examiner—Robert J. Spar
Assistant Examiner—Kenneth Noland
Attorney, Agent, or Firm—Stevens, Davis, Miller & Mosher

[57] ABSTRACT

An underground mine cable handler comprises two parallel ropes hauled behind the mining machine, a series of box like elements being threaded on the ropes to provide a protective corridor for at least one supply cable and/or hose for the machine.

5 Claims, 11 Drawing Figures

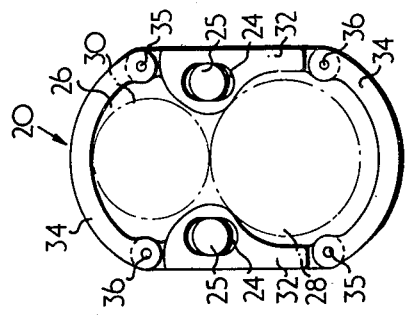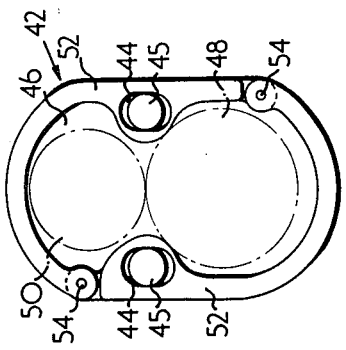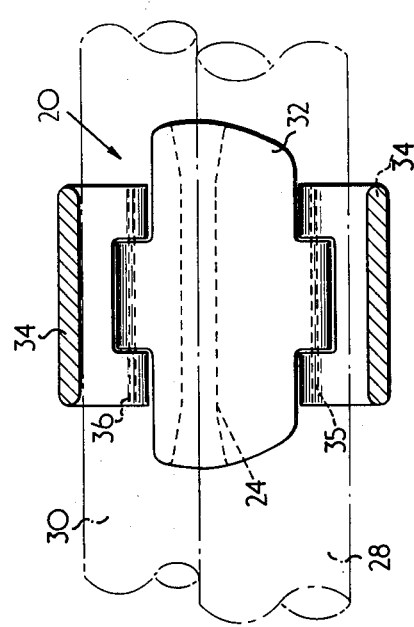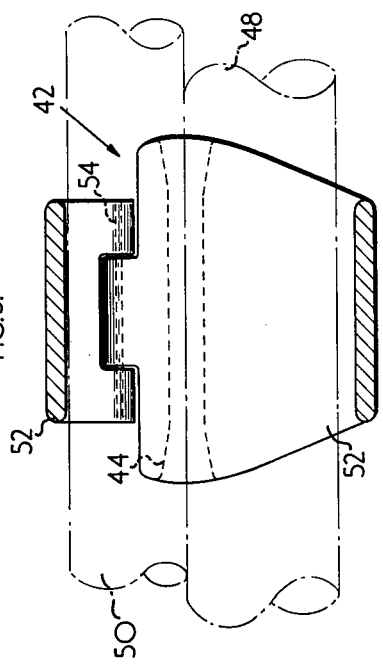

UNDERGROUND MINE EQUIPMENT

This invention relates to underground mine equipment and in particular to equipment for protecting supply cables and/or hoses to mining machines which, in use, traverse to and fro along longwall faces.

An object of the present invention is to provide improved cable and/or hose protection equipment.

According to the present invention underground mine equipment for protecting supply cable and/or hose components to a mining machine adapted to traverse to and fro along a longwall face, comprises at least one flexible elongated member adapted at one end for connection to the machine, and a plurality of elements retainable in series along the elongated member to provide a corridor for at least one supply component.

Preferably, each of the elements has a through passage for the elongated member, the elements being threaded onto the elongated member.

Conveniently, two parallel elongated members are provided.

By way of example only, three embodiments of the present invention will be described with reference to the accompanying drawings, in which:

FIG. 5 is a sectional side view of a detail of a second embodiment of the invention;

FIG. 6 is an end view of the detail of FIG. 5;

FIG. 7 is a sectional side view of a detail of a third embodiment of the invention;

FIG. 8 is an end view of the detail of FIG. 7;

Referring to the FIGS. 1 to 4 of the drawings, underground mine equipment for protecting supply cable and/or hose components to a mining machine which in use traverses to and fro along a longwall face comprises two parallel elongated members 1 (only a part of one of which can be seen in FIG. 1) which are adapted at one end to be secured to the mining machine. The elongated members typically are constituted by wire ropes, cables, chains or other similar flexible elongated members. The elongated components extend from the machine to a location adjacent the mid point of the working face where the elongated member is unaffected by movement of the machine and remains stationary throughout the machines traversing.

Figure 1:
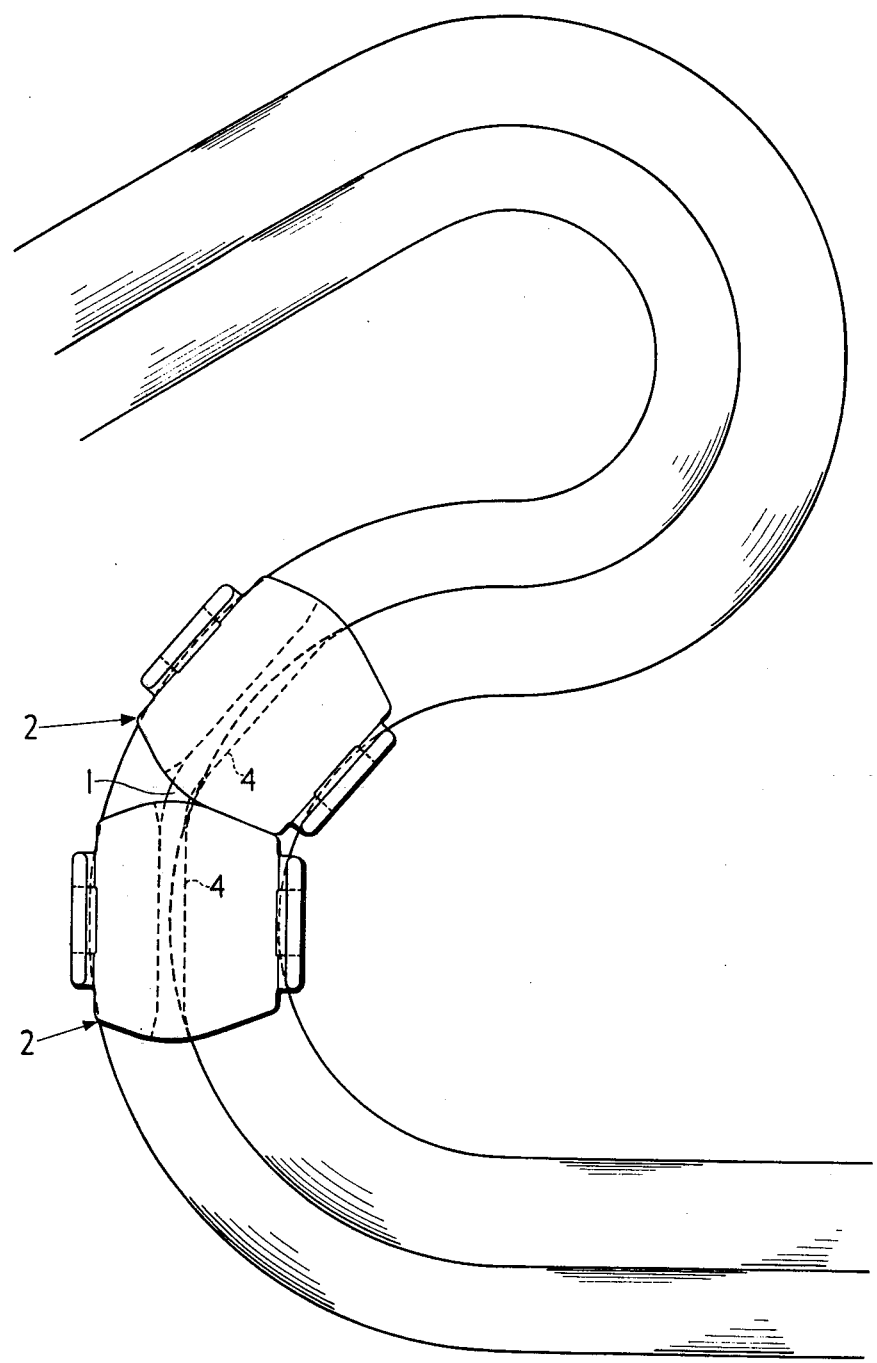
FIG. 1 is an incomplete side view of underground mine equipment constructed in accordance with the present invention, and shown in an operable position.

A plurality of open box like elements 2 (only two of which are shown in FIG. 1) having through passages 4 are threaded onto the elongated members so as to form a series of elements forming a corridor 6 for accommodating an electric supply cable 8 and a water supply hose 10.

Each element 2 comprises two opposed side wall units 12 interconnected top and bottom by cross units 14. Adjacent ends of the units 12, 14 have bores 16 for connecting pins (not shown).

In use the elements are threaded onto the elongated members until a series of elements extends from the machine to the stationary section of the elongated member. The pins are removed from the bores 16 to permit the box elements to be opened exposing the corridor and allowing the cable 8 and hose 10 to be placed into the elements where they are protected. Once inside the box elements the cable and hose are not only protected from falling rock or other equipment and from scuffing and tearing but in addition are relieved of tension as the machine traverses along the working face. The hauling forces are carried by the elongated members which haul the series of elements along behind the machine, the cable and hose being carried in the elements.

As the machine changes direction of traverse along the face the series of elements forms a loop which moves along the working face at half the velocity of the machine. When the machine is approaching the end of its traverse the loop is approaching the mid-point of the working face and consequently tends to form a double loop as indicated in FIG. 1. However, by the time the machine reaches the end of its traverse a single loop is formed ready for the machine to traverse along the face in the opposite direction.

The curved end faces of the side wall units 12 and the bell-mouthed openings of the passages 4 permit the equipment to form loops as indicated in FIG. 1. In addition, the same constructional details permit the equipment to negotiate undulations in the mine floor and machine track.

The equipment is carried in a channel formed by a series of trough members (not shown) secured to an armoured face conveyor arranged along the mineral face and made up of a series of pans articulatedly connected end to end, the trough members being secured to the pans, respectively. As the mining machine traverses to and fro winning strips of mineral from the face the conveyor is advanced in well known snake-like manner towards the newly exposed face. Since the elements are not connected to one another they can easily accommodate the limited articulated movement of the conveyor pans during conveyor advance. Adjacent elements pivot about the co-operating side wall units on one side of the elements allowing the side wall units on the opposite side to temporarily part. The flexible elongated member bends intermediate the adjacent elements.

Figure 3:
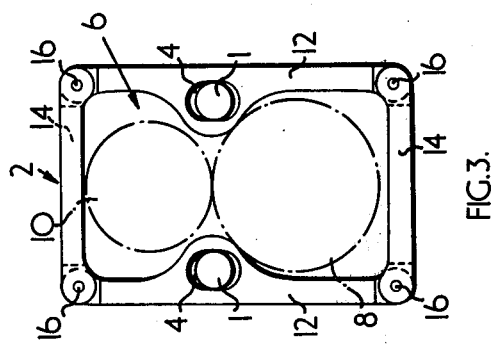
FIG. 3 is an end view of the detail of FIG. 2.
Figure 4:
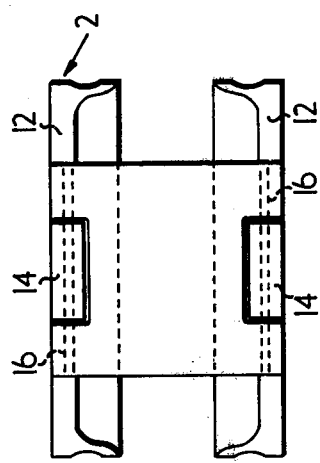
FIG. 4 is a plan of the detail of FIG. 2.
Figure 2:
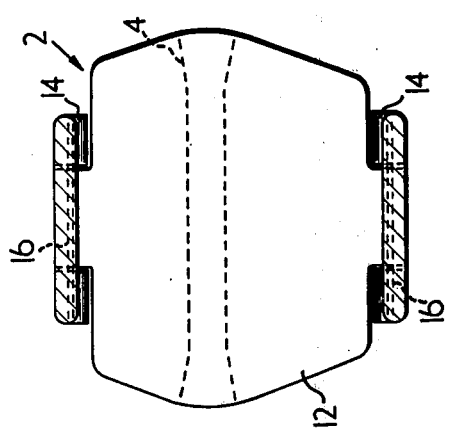
FIG. 2 is a side view of a detail of FIG. 1.

The construction of the equipment shown in the drawing takes advantage of the fact that the elasticity of the cable and hose allows one of the components to be stretched to a greater or lesser degree compared with the other of the components as the components pass around a loop. This enables the two components to be arranged one on top of the other as shown in FIG. 3. Consequently, relatively narrow elements can be adopted enabling a relatively small "prop free front distance" to be achieved i.e. the distance between the newly formed unmined face and the first row of supporting props. Previous cable protecting equipment required the cable and hose components to be arranged side by side horizontally. Thus, the prior known equipment tended to be relatively wide.

FIGS. 5 and 6 of the drawings show details of an element 20 constructed in accordance with a second embodiment of the invention and having through passage 24 enabling a series of the elements to be threaded onto the elongated members 25 in a similar manner to the previously described embodiment such that the series of the elements 20 forms a corridor 26 for accommodating an electric supply cable 28 and a water supply hose 30.

Each element comprises two opposed side wall units 32 interconnected top and bottom by curved cross units 34 which are pivotally connected to the side wall units by hinge connections 35 and releasably connected to the other of the side wall units 32 by pins 36 engaging in aligned bores in the units 32 and 34 in similar manner to that described with reference to the first described embodiment.

As will be seen in the drawings, the second embodiment of the invention is more compact than the previously described embodiment.

FIGS. 7 and 8 of the drawings show details of an element 42 constructed in accordance with a third embodiment of the invention. The element has passages 44 for accommodating elongated members 45 such that a series of elements threaded on the elongated members forms a corridor 46 for accommodating an electric supply cable 48 and a water supply hose 50 in similar manner to the first embodiment described with reference to FIGS. 1 to 4 of the drawings.

Each element 42 comprises two opposed wall units 52 which are interconnected by pins 54 engaging in aligned bores provided in both ends of the wall units 52.

From the drawings it will be seen that the third embodiment of the invention provides compact equipment having a simple construction.

Figure 10:
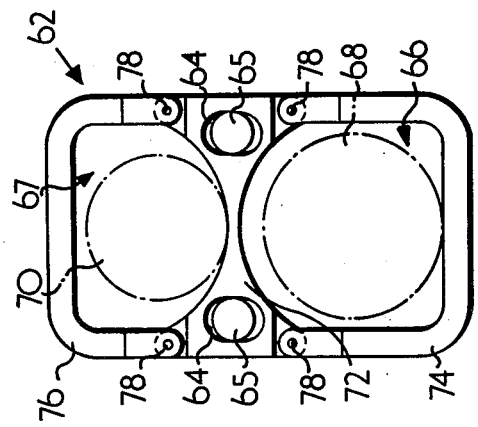
FIG. 10 is an end view of the detail of FIG. 9.
Figure 11:
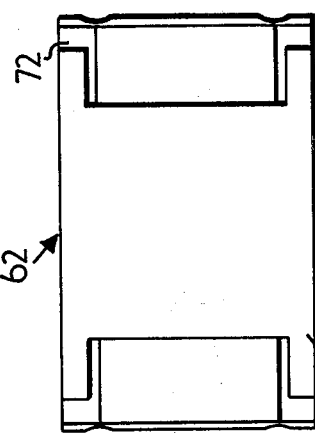
FIG. 11 is a plan of the third detail of FIG. 9.
Figure 9:
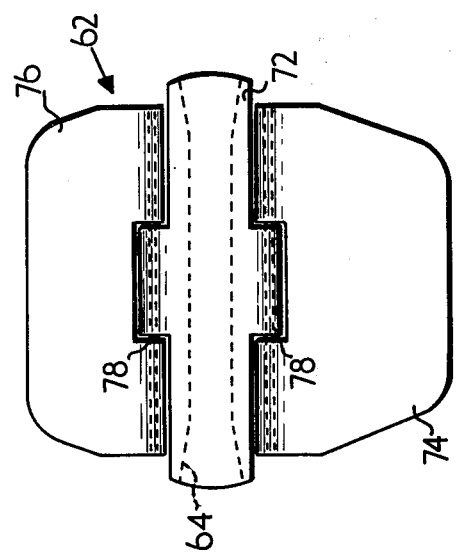
FIG. 9 is a side view of a detail of a fourth embodiment of the invention.

FIGS. 9, 10 and 11 of the drawings show details of an element 62 constructed in accordance with a fourth embodiment of the invention. The element has passages 64 for accommodating elongated members 65 such that a series of the elements threaded on the elongated members form two parallel corridors 66, 67 for accommodating an electric supply cable 68 and a water supply hose 70 in similar manner to the first embodiment described with reference to FIG. 1 of the drawings.

Each element 62 comprises a central member 72 and two generally 'U' shaped wall members 74, 76 secured on opposite sides of the central member 72 by pins 78 engaging in aligned bores provided in the member 72, 74 and 76. The central member 72 is provided with the two earlier mentioned passages 64 for accommodation on the elongated member.

In other embodiments of the present invention the passages for accommodating the elongated members may be slots having an opening in a side face of the wall units such that the elongated members can be clipped into the passage rather than threaded through the passage.

In further embodiments of the invention, the elongated members are pretensioned to ensure the series of elements is maintained up to the machine.

From the above description it will be seen that the present invention provides equipment for protecting cable and hose supply components to a mining machine which is compact, robust, relatively easily replaced and which provide relatively easy access to the components.

If more than two supply components (8, 10) are required the elements can be made to accommodate the components in a side by side arrangement. The first two described embodiments could be modified merely by providing new cross units 34, 52.

I claim:

1. Underground mine equipment for protecting supply cable and/or hose components to a mining machine adapted to traverse to and fro along a longwall face, comprising at least one flexible elongated member adapted at one end for connection to the machine so as to be hauled behind the machine as the machine traverses to and fro along the longwall face, and a plurality of elements threaded on and retainable in series along the elongated member to provide a corridor for at least one supply component, the corridor extending along the elongated member which in use, when the equipment is being hauled behind the machine, carries the resulting hauling forces, the elements including at least one aperture for receiving said flexible elongated member when said elements are threaded thereon, said at least one aperture formed in a wall of said element and having an unbroken interior wall structure, and means separate from said elongated member, which when the equipment is being hauled behind the machine retain the corridor closed to retain the supply component in position within the corridor but which when the equipment is not being hauled can be pivotally released to open the corridor to expose and permit access to the supply component.

2. Equipment as claimed in claim 1, in which each element comprises at least two pivotally connected retaining members.

3. Equipment as claimed in claim 2, in which the retaining members are connected to the remainder of the element by pins engaging in aligned bores in the members and in the element.

4. The equipment as claimed in claim 1, in which said apertures have bell-mouthed openings for accomodating the elongated member.

5. The equipment as claimed in claim 1, in which adjacent ends of adjacent elements are curved.

* * * * *